United States Patent
Zhuang et al.

(10) Patent No.: US 9,959,284 B2
(45) Date of Patent: May 1, 2018

(54) SYSTEM AND METHOD FOR SYNCHRONIZING HISTORY DATA FOR COMPRESSION AND DECOMPRESSION

(71) Applicant: AppEx NETWORKS HOLDING LIMITED, Cupertino, CA (US)

(72) Inventors: Hao Zhuang, Sammamish, WA (US); Yongdong Wang, Cupertino, CA (US)

(73) Assignee: AppEx NETWORKS HOLDING LIMITED, Cupertino, CA (US)

( * ) Notice: Subject to any disclaimer, the term of this patent is extended or adjusted under 35 U.S.C. 154(b) by 395 days.

(21) Appl. No.: 14/591,750

(22) Filed: Jan. 7, 2015

(65) Prior Publication Data

US 2015/0199241 A1    Jul. 16, 2015

Related U.S. Application Data

(60) Provisional application No. 61/926,145, filed on Jan. 10, 2014.

(51) Int. Cl.
*G06F 17/30* (2006.01)

(52) U.S. Cl.
CPC .. *G06F 17/30156* (2013.01); *G06F 17/30153* (2013.01); *G06F 17/30159* (2013.01); *G06F 17/30174* (2013.01); *G06F 17/30309* (2013.01)

(58) Field of Classification Search
CPC ......... G06F 17/30156; G06F 17/30153; G06F 17/159; G06F 17/30174; G06F 17/30309
USPC ........................................ 707/692, 690, 693
See application file for complete search history.

(56) References Cited

U.S. PATENT DOCUMENTS

| | | | | |
|---|---|---|---|---|
| 8,156,074 B1 * | 4/2012 | Multer | .............. | G06F 17/30174 707/610 |
| 2008/0224906 A1 * | 9/2008 | Plamondon | .............. | H03M 7/30 341/76 |
| 2010/0070474 A1 * | 3/2010 | Lad | ........................ | G06F 3/0605 707/624 |
| 2010/0169693 A1 * | 7/2010 | Mukherjee | .......... | G06F 11/1641 713/375 |
| 2011/0125722 A1 * | 5/2011 | Rao | ...................... | G06F 17/3015 707/693 |
| 2012/0124006 A1 * | 5/2012 | Zizys | .................. | G06F 11/1451 707/676 |

* cited by examiner

*Primary Examiner* — Robert W Beausoliel, Jr.
*Assistant Examiner* — Pedro J Santos

(57) ABSTRACT

An apparatus and a computer-implemented method for processing data are disclosed. The apparatus comprises a memory device that stores first history data, and at least one processor configured to modify a first portion of the first history data, transmit first information to a recipient device reflecting the modification to the first portion of the first history data, determine that the recipient device has modified a second portion of the second history data associated with the first portion based on the first information, receive input data, and responsive to the confirmation, transmit one or more reference tokens reflecting a relationship between the modified first history data and one or more portions of the input data, wherein the one or more first reference tokens allows the recipient device to reconstruct the one or more portions of the input data from the modified second portion of the second history data.

20 Claims, 16 Drawing Sheets

350

| Chunk ID | Block Signature | Data Offset |
|---|---|---|
| 3003 | 1234 | 0 |
| 3003 | 5678 | 64 |
| 2999 | 1234 | 0 |
| 2999 | 5678 | 64 |

352 — Chunk ID
354 — Block Signature
356 — Data Offset

| Chunk ID | Disk Signature |
|---|---|
| 3003 | 3242 |
| 2999 | 2351 |

372 — Chunk ID
374 — Disk Signature

FIG. 3C

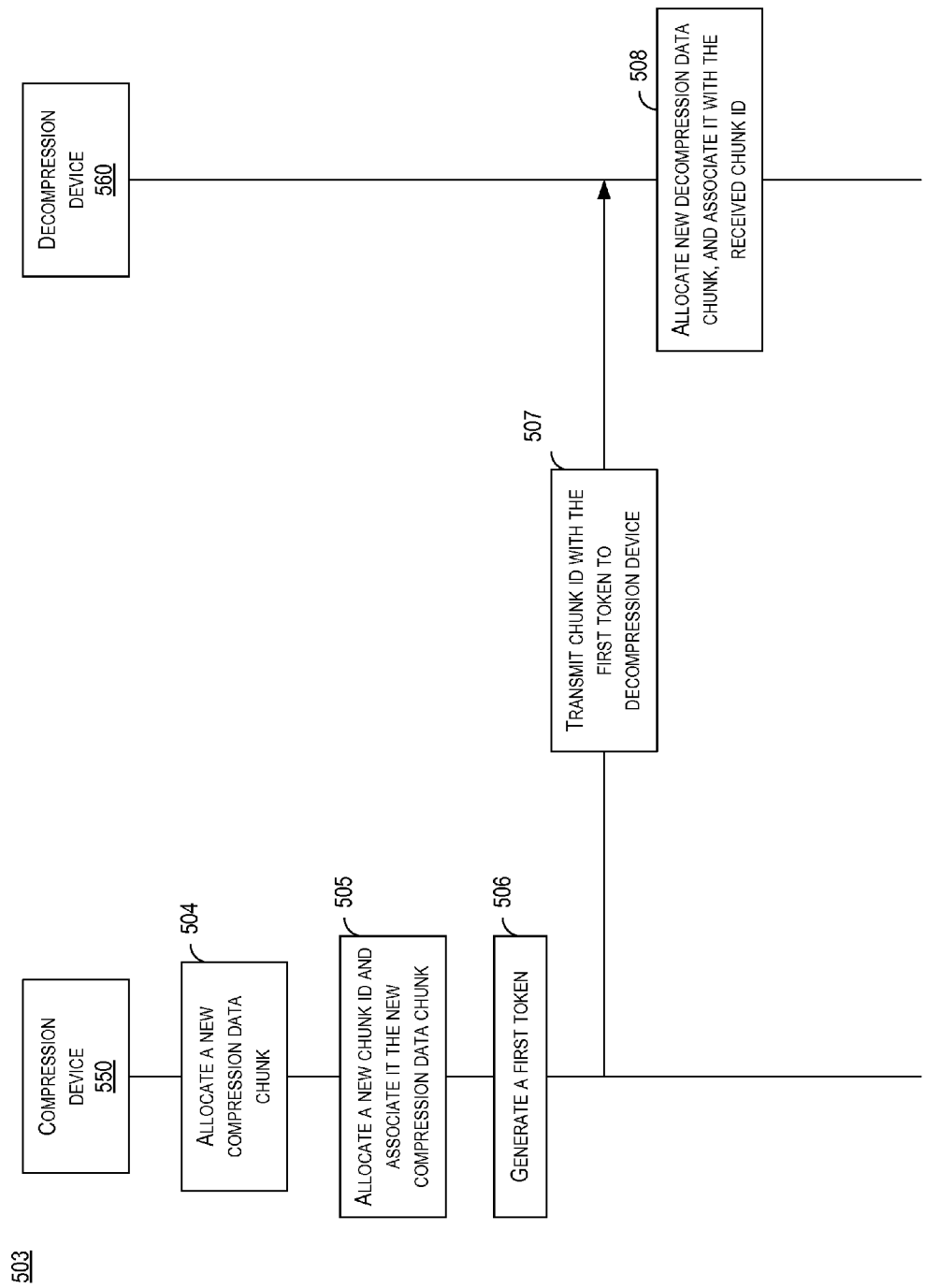

SYSTEM AND METHOD FOR SYNCHRONIZING HISTORY DATA FOR COMPRESSION AND DECOMPRESSION

CROSS REFERENCE TO RELATED APPLICATIONS

This application claims the priority benefit of U.S. Provisional Application No. 61/926,145, filed Jan. 10, 2014, the content of which is hereby incorporated by reference in its entirety.

TECHNICAL FIELD

The present disclosure relates to a technical field of compression and decompression of data, and particular to data containing redundancies.

BACKGROUND

It is common to transfer large volume of data over a computer network, or between storage devices over an I/O (input/output) interface. For example, a user may transfer a whole home directory from a hard drive to a non-volatile memory device (e.g., a flash drive) to perform a periodic backup of the hard drive, or transfer a large document file over the Internet. The data transferred can include redundant data, i.e. data that the recipient already possesses. For example, in the case where the user is creating a periodic backup of the hard drive on the flash drive, the backup data to be transmitted to the flash drive typically contains data that already exists in the flash drive. Similarly, in the case where the user transfers the document file over the Internet, the user may be downloading the file from a network source (e.g., a server), modifying it, and uploading the file back to the network source. If the document file is not completely modified, common data can also exist between the version of the file uploaded and the version of the file downloaded. Transmitting redundant data that is stored in both the source and the destination leads to inefficient utilization of bandwidth of I/O interface and network. Existing compression and decompression methods fail to take advantage of such data redundancies, since locating redundant data over gigabytes to terabytes data storage is generally considered to be time-consuming and with low yield.

Hence, there is a need for a technique to search for redundant data within huge volume of data, in an efficient manner and with a high probability of locating the redundancies, which can minimize the transmission of redundant data and can improve the utilization of limited bandwidth of I/O interface and network. There is also a need for a technique to ensure that the compression and decompression sides have access to the same redundant data.

SUMMARY OF THE DISCLOSURE

Additional aspects and advantages of embodiments of present disclosure will be given in part in the following descriptions, become apparent in part from the following descriptions, or be learned from the practice of the embodiments of the present disclosure.

According to some embodiments, an apparatus comprises a memory device that stores first history data, and at least one processor configured to modify a first portion of the first history data and transmit first information to a recipient device, wherein the first information reflects the modification to the first portion of the first history data and allows the recipient device to modify a second portion of the second history data based on the first information, and wherein the second portion of the second history data is associated with the first portion of the first history data. The processor is further configured to determine that the recipient device has modified the second portion of the second history data based on the first information, receive input data, responsive to a confirmation that the recipient device has modified the second portion of the second history data based on the first information, and transmit one or more reference tokens reflecting a relationship between the modified first history data and one or more portions of the input data, wherein the one or more first reference tokens allows the recipient device to reconstruct the one or more portions of the input data from the modified second portion of the second history data.

According to some embodiments, the modification to the first history data includes adding first data to the first portion of the first history data and storing a first location value reflecting a location and a size of the added first data in the modified first history data. In some embodiments, the at least one processor is further configured to receive second information from the recipient device, wherein the second information includes a second location value associated with the addition of the first data to the second history data, and determine a relationship between the first location value and the second location value, wherein a determination that the recipient device has modified the second portion of the second history data based on the first information is based on the determined relationship between the first location value and the second location value. In some embodiments, the at least one processor is further configured to, based on the relationship between the first location value and the second location value, detect a discrepancy between the modified first portion of the first history data and the modified second portion of the second history data, and responsive to detecting the discrepancy, transmit a first instruction to the recipient device to cause the recipient device to delete the modified second portion of the second history data.

According to some embodiments, the apparatus further comprises a data storage device, and wherein the at least one processor is further configured to determine that the first portion of the first history data is closed to additional data after the first data is added to the first portion of the first history data, responsive to receiving the second information, determine that the second portion of the second history data is also closed to additional data after the first data is added, wherein the second information includes an indication that the second portion of the second history data is closed, and responsive to the determination that the second portion of the second history data is also closed to additional data after the first data is added, determine that the first portion of the first history data can be swapped out to the data storage device from the memory device. In some embodiments, the at least one processor is further configured to transmit the first information after at least part of the first data is added to the first portion of the first history data.

According to some embodiments, the modification to the first portion of the first history data includes deleting the first portion of the first history data from the memory device, and wherein the first information includes a first timestamp indicating when the first portion of the first history data is to be deleted, and a second instruction to the recipient device to delete the second portion of the second history data no later than the time indicated by the first timestamp. In some embodiments, the first portion of the first history data is associated with a first count value reflecting a number of times the first portion is accessed to generate the one or more reference tokens, and wherein the first information includes the first count value. In some embodiments, the second portion of the second history data is associated with a second count value reflecting a number of times the corresponding portion is accessed in response to receiving the one or more reference tokens; and wherein the second instruction allows the second portion of the second history data to be deleted before the time indicated by the first timestamp if the first count value matches with the second count value. In some embodiments, the first portion of the first history data is associated with a second timestamp reflecting a time when the first portion is updated, and wherein the at least one processor is further configured to determine to delete the first portion of the first history data based on the second timestamp.

According to some embodiments, a computer-implemented method for processing data comprises receiving first history data from a memory device, modifying a first portion of the first history data, transmitting first information to a recipient device, wherein the first information reflects the modification to the first portion of the first history data and allows the recipient device to modify a second portion of the second history data based on the first information, and wherein the second portion of the second history data is associated with the first portion of the first history data, determining that the recipient device has modified the second portion of the second history data based on the first information, receiving input data, and responsive to a confirmation that the recipient device has modified the second portion of the second history data based on the first information, transmitting one or more reference tokens reflecting a relationship between the modified first history data and one or more portions of the input data, wherein the one or more first reference tokens allows the recipient device to reconstruct the one or more portions of the input data from the modified second portion of the second history data.

BRIEF DESCRIPTION OF THE DRAWINGS

Reference will now be made to the accompanying drawings showing example embodiments of the present application, and in which:

FIG. 3A-3C are block diagrams illustrating exemplary data structures for facilitating searching of history data according to embodiments of the present disclosure.

FIGS. 5A-5H are flowcharts illustrating exemplary methods of generating and deleting data chunks between a compression device and a decompression device according to embodiments of the present disclosure.

DETAILED DESCRIPTION

Reference will now be made in detail to the embodiments, the examples of which are illustrated in the accompanying drawings. Whenever possible, the same reference numbers will be used throughout the drawings to refer to the same or like parts.

The description of the embodiments is only exemplary, and is not intended to be limiting. The disclosure and claims use reference numbers "first," "second," and "third" for description purpose. A person having ordinary skill in the art should understand that they do not mean or refer to "the first," "the second," or "the third."

According to some embodiments, the operations, techniques, and/or components described herein can be implemented by an electronic device, which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that incorporates hard-wired and/or program logic to implement the techniques and other features of the present disclosure.

The one or more special-purpose computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Operating systems control and schedule computer processes for execution, perform memory management, provide file system, networking, I/O services, and provide a user interface functionality, such as a graphical user interface ("GUI"), among other things.

Figure 1:
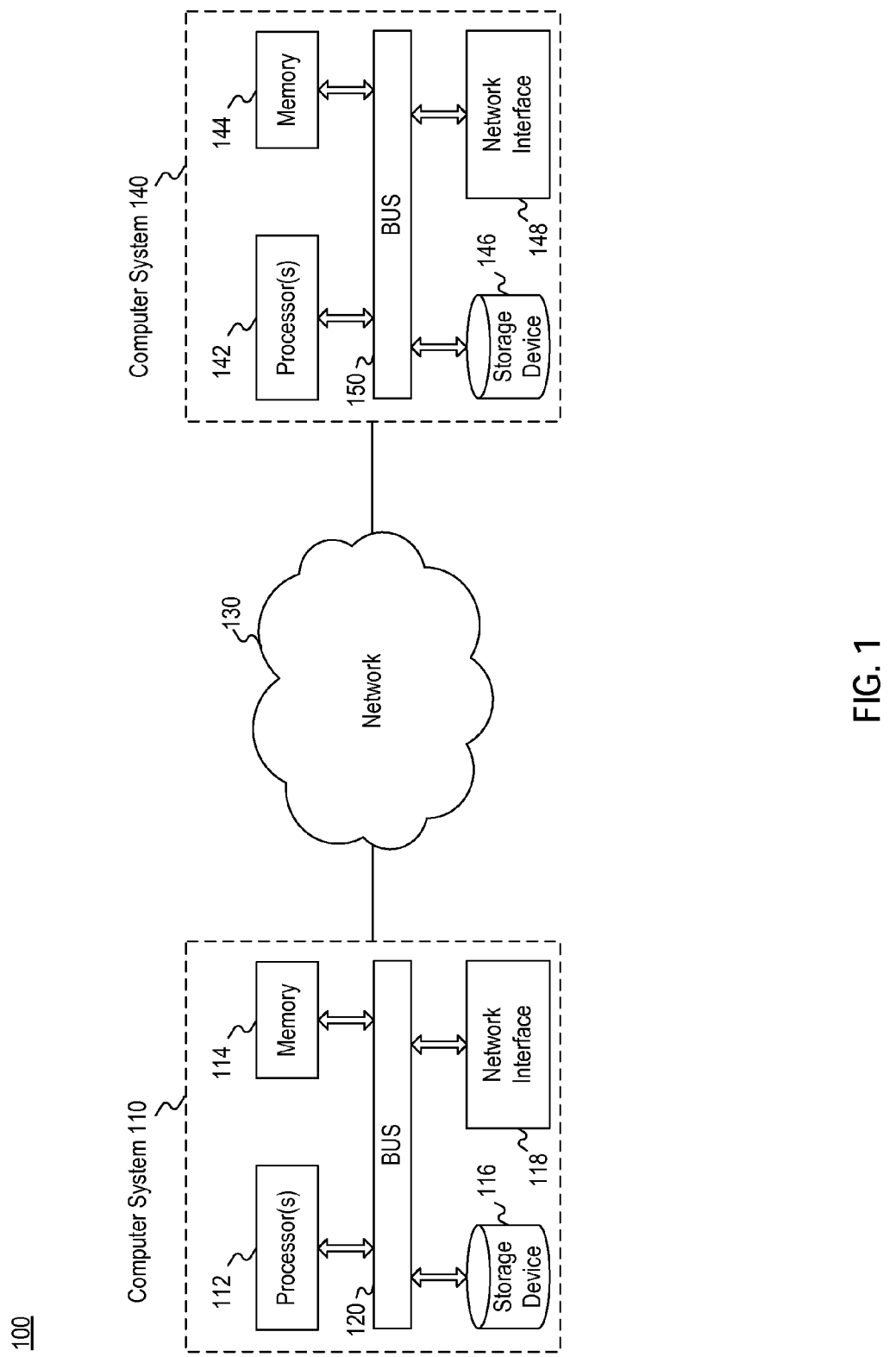
FIG. 1 is a block diagram of an exemplary network system with which embodiments of the present disclosure can be used.

FIG. 1 is a block diagram of an exemplary system 100 with which embodiments described herein can be used. As shown in FIG. 1, system 100 includes a first computer system 110, a network 130, and a second computer system 140. First computer system 110 includes one or more processors 112, a memory device 114, a storage device 116, and a network interface 118, all of which can communicate with each other via a bus 120. Through network 130, first computer system 100 can exchange data with a second computer system 140. Second computer system 140 also includes one or more processors 142, a memory device 144, a storage device 146, and a network interface 148, all of which can communicate with each other via a bus 150.

Both memories 114 and 144 can be a random access memory (RAM) or other volatile storage devices for storing information and instructions to be executed by, respectively, processors 112 and 142. Memories 114 and 144 also can be used for storing temporary variables or other intermediate information during execution of instructions to be executed by processors 112 and 142. Such instructions, after being stored in non-transitory storage media accessible to processors 112 and 114 (e.g., storage devices 116 and 146), render computer systems 110 and 140 into special-purpose machines that are customized to perform the operations specified in the instructions. The instructions can be organized into different software modules, which can include, by way of example, components, such as software components, object-oriented software components, class components and task components, processes, functions, fields, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage.

Computer systems 110 and 140 can implement the techniques described herein using customized hard-wired logic, one or more ASICs or FPGAs, firmware and/or program logic which in combination with the computer system causes or programs computer systems 110 and 140 to be a special-purpose machine. According to some embodiments, the operations, functionalities, and techniques and other features described herein are performed by computer systems 110 and 140 in response to processors 112 and 142 executing one or more sequences of one or more instructions contained in, respectively, memories 114 and 144. Such instructions can be read into memories 114 and 144 from another storage medium, such as storage devices 116 and 146. Execution of the sequences of instructions contained in memories 114 and 144 cause respectively processors 112 and 142 to perform the process steps described herein. In alternative embodiments, hard-wired circuitry can be used in place of or in combination with software instructions.

The term "non-transitory media" as used herein refers to any non-transitory media for storing data and/or instructions that cause a machine to operate in a specific fashion. Such non-transitory media can comprise non-volatile media and/or volatile media. Non-volatile media can include, for example, optical or magnetic devices, such as storage devices 116 and 146. Volatile media can include dynamic memory, such as memories 114 and 144. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Network interfaces 118 and 148 can provide a two-way data communication coupling to network 130. For example, network interfaces 118 and 148 can be an integrated services digital network (ISDN) card, cable modem, satellite modem, or a modem to provide a data communication connection to a corresponding type of telephone line. As another example, network interfaces 118 and 148 can be a local area network (LAN) card to provide a data communication connection to a compatible LAN. Wireless links can also be implemented. In any such implementation, network interfaces 118 and 148 can send and receive electrical, electromagnetic or optical signals that carry digital data streams representing various types of information, and provide the data stream to storage devices 116 and 146. Processors 112 and 142 can then convert the data into a different form (e.g., by executing software instructions to compress or decompress the data), and then store the converted data into the storage devices (e.g., storage devices 116 and 146), and/or transmit the converted data via network interfaces 118 and 148 over network 130.

Figure 2:
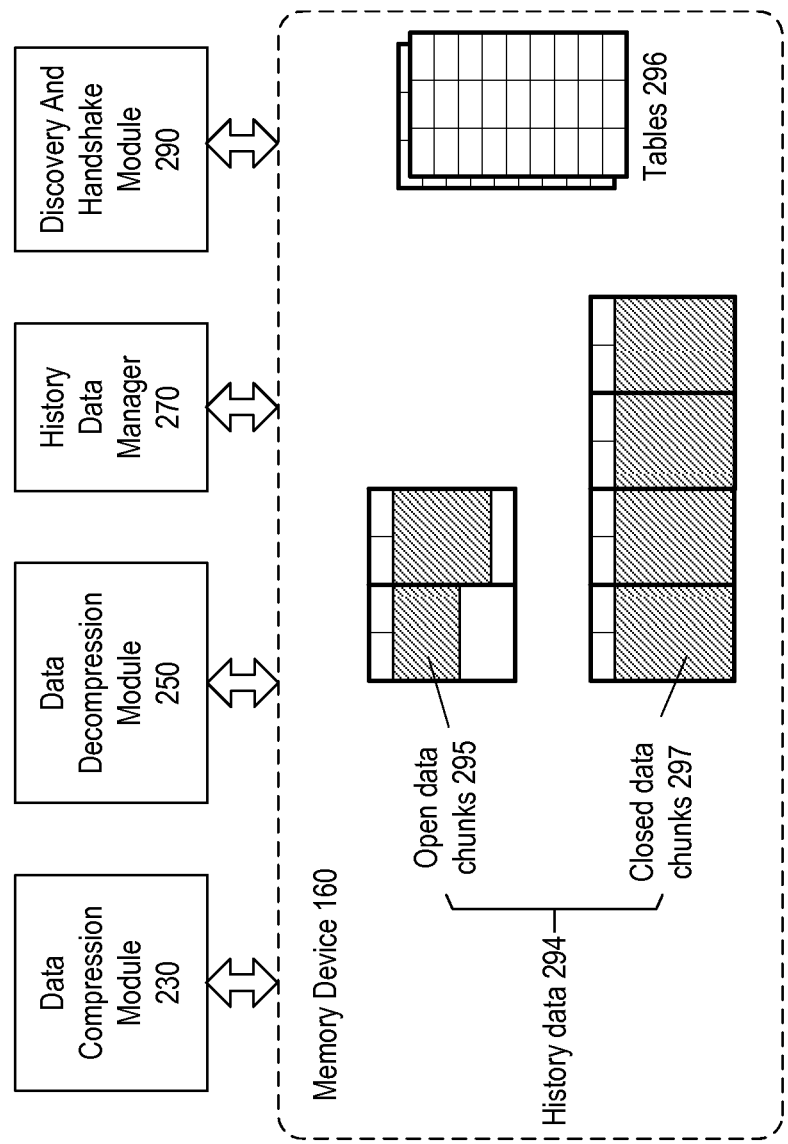
FIG. 2 is a block diagram depicting an exemplary system with which embodiments of the present disclosure can be implemented.

FIG. 2 is a block diagram depicting an exemplary system 200 with which embodiments of the present disclosure can be implemented. In some embodiments, system 200 can be implemented as system 110 of FIG. 1 and includes data compression module 230, data decompression module 250, history data manager 270, and discovery and handshake module 290, at least some of which, when executed by a processor (e.g. processor 112 of FIG. 1), can retrieve and/or update history data 294 and one or more tables 296 stored in memory device 160 as system 200 is compressing or decompressing an input data stream. Although FIG. 2 shows that system 200 includes both data compression module 230 and data decompression module 250, it is understood that system 200 can include only data compression module 230 to compress data, while a recipient system (e.g. system 140 in FIG. 1) can include only data decompression module 250 to receive the compressed data from system 200, and then decompress it. Moreover, although FIG. 2 shows that history data 294 and tables 296 are two separate entities, it is understood that both can be part of a data structure.

History data 294 includes data that is recently compressed and/or data that is recently generated as a result of decompressing other data, while tables 296 include information that can facilitate a search for a piece of data within history data 294. In some embodiments, history data 294 includes data which system 200 expects to be redundant for a particular transmission. For example, when system 200 receives an instruction to transmit data to the recipient system (e.g. system 140 in FIG. 1), it may expect that at least part of the data to be transmitted is already part of corresponding history data stored in system 140, hence rendering this part of the data redundant and obviating the need to transmit the redundant data. Using information from tables 296, system 200 can search for and locate the redundant data within history data 294. After locating the redundant data, and knowing that system 140 also stores the same redundant data, system 200 can then transmit, to system 140, information indicating a relationship between the redundant data and history data 294 (and/or the corresponding history data stored in system 140). Such a relationship can be, for example, a location and size of the redundant data in the corresponding history data stored in system 140. Such a relationship typically can be expressed with much less data than the redundant data itself. Therefore, the transmission of the relationship information, instead of the redundant data, can conserve the bandwidth of the medium (e.g., network 130 of FIG. 1) over which the transmission occurs. System 200 can also compress the information to further reduce the volume of data to be transmitted.

In some embodiments, as shown in FIG. 2, history data 294 can be organized into one or more data chunks, which include open data chunks 295 and closed data chunks 297. A data chunk can be a fixed-size data buffer allocated in memory device 160. As to be discussed later, open data chunks are chunks which are in the middle of being updated as a result of compressing or decompressing the input data stream, while closed data chunks are chunks which are closed and is not currently accepting additional data, either from compressing or decompressing the input data stream. There can be various reasons which cause a chunk to become closed to additional data. For example, a chunk, being of fixed-size, has been filled up with data or does not sufficient space to take up the new data, therefore the chunk cannot take in any more data and is closed. Moreover, a chunk can also become closed when the system retrieves or updates a different chunk, even if it is not yet filled up or has sufficient space for new data. Further details about history data 294 and tables 296 will be discussed below. One of the open data chunks is to be designated as a working data chunk.

Data compression module 230 can receive raw data (e.g., from another application executed by processor 112 of FIG. 1) and an instruction to compress the raw data. Data compression module 230 can then look for the raw data in history data 294 using information from tables 296. Portions of history data 294 can be stored in the memory (e.g. memory device 114 of FIG. 1) and/or in storage device (e.g. storage device 116 of FIG. 1). If the data compression module 230 finds the raw data in history data 294, data compression module 230 can generate a reference token which includes information to assist the recipient system to find the same piece of raw data in its corresponding history data. The information included in the reference token can indicate a location within history data 294, as well as a length of the data which matches the raw data. The reference token can then be transmitted to the receiving system. On the other hand, if data compression module 230 cannot find the raw data in history data 294, the raw data will be transmitted as part of raw tokens to the receiving system. The raw tokens and reference tokens can then be used to form a token stream. In some embodiments, the input data can also be added to history data 294, and tables 296 can be updated with information for locating the added input data in the updated history data 294. In some embodiments, the token stream can be compressed using one or more lossless data stream compression algorithms, before being transmitted. In some embodiments, the token stream (compressed or not) can also be packetized via, for example, network interface 118 of FIG. 1, and the packetized token stream can then be transmitted over a network (e.g. network 130 of FIG. 1). Data compression module can also add the raw data to history data 294, and update tables 296 with the information for locating the added data in the updated history data 294.

Data decompression module 250 can reconstruct a data stream from the token stream transmitted by data compression module 230. After receiving and de-multiplexing the packetized data to retrieve the data packets containing reference and/or raw tokens (and decompressing the de-multiplexed data if the data is compressed) to obtain the token stream, data decompression module 250 can identify the reference tokens and/or raw tokens from the token stream. With each identified reference token, data decompression module 250 can retrieve the data associated with the reference token from history data 294 based on the location and length information of the reference token, and add the retrieved data to an output data stream meant for, for example, another application executed on processors 112. For the raw tokens, data decompression module 250 can add the raw data included in the raw tokens into the output data stream. Data decompression module 250 can also update history data 294 to include the output data stream, and update tables 296 with the information for locating the added data in the updated history data 294.

Exemplary embodiments for methods and systems of compression and decompression of data containing redundancies are described in U.S. Provisional Patent Application No. 61/913,295, titled Method and Apparatus for Data Compression, filed on Dec. 7, 2013, and in co-pending U.S. Non-provisional patent application Ser. No. 14/559,816, titled System and Method for Compression and Decompression of Data Containing Redundancies, filed on Dec. 3, 2014, the entire content of both of which are incorporated herein by reference for all purposes.

History data manager 270 manages the creation and deletion of history data 294, on top of the updating by data compression module 230 and data decompression module 250. For example, history data manager 270 can delete some of the history data 294 which is old to make room for new history data. History data manager 270 can also synchronize with the recipient system, or other system from which system 200 receives data, about the changes in the history data, so that both sides involved in the transmission of the token streams have the same history data.

Discovery and handshake module 290 can determine whether a communication peer supports the methods of compression and/or decompression consistent with embodiments of the present disclosure. The determination may include, for example, whether the peer includes a data compression module 230 and/or data decompression module 250 and is capable of processing (and/or transmitting) reference tokens and raw tokens according to embodiments of the present disclosure.

Exemplary embodiments for methods and systems for compression device handshake and discovery are described in U.S. Provisional Patent Application No. 61/926,158, titled Method and Apparatus for Compression Device Discovery and Handshake, filed on Jan. 10, 2014, the entire content of which is incorporated herein by reference for all purposes.

Figure 3A:
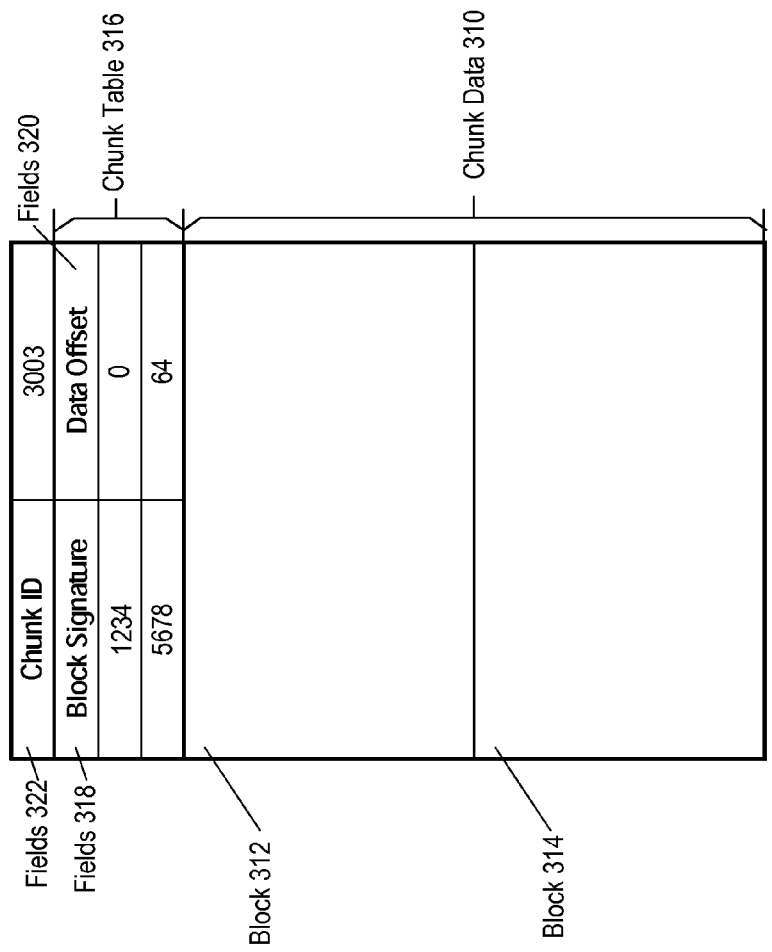

FIG. 3A is a block diagram illustrating an exemplary data chunk structure 300 for facilitating searching of history data according to embodiments of the present disclosure. As discussed before, history data can be organized into one or more data chunks (e.g., open chunks 295 and closed chunks 297 of FIG. 2), and each data chunk being represented by a data chunk structure 300. A data chunk structure 300 can be stored in either a memory (e.g. memory 114 of FIG. 1), and/or in a storage device (e.g. storage device 116 of FIG. 1). As to be discussed later, a data chunk structure can be swapped out of memory into a storage device, or vice versa. Each data chunk structure 300 includes chunk data 310, which can include one or more data blocks 312 and 314. A block can refer to a unit of data size adopted by all devices supporting the methods of compression and/or decompression consistent with embodiments of the present disclosure. For example, a block size can be of 64 byte. The block size can be any number.

Data chunk structure 300 is also associated with a chunk table 316. Although FIG. 3A shows that chunk table 316 is part of data chunk structure 300 and next to data blocks 312 and 314, it is understood that chunk table 316 needs not be stored in the same location as the data blocks. In some embodiments, chunk table 316 can be part of tables 296 of FIG. 2 and include information for locating a piece of data within data chunk structure 300. Such information can include an identifier used to identify the piece of data, and the location of the data within data chunk structure 300. As shown in FIG. 3A, chunk table 316 includes fields 318 to store a block signature, which is generated to represent the content of a particular block of data. For example, a block signature of "1234" is associated with data block 312. Besides, a block signature of "5678" is associated with data block 314. Further details about the generation of block signatures will be discussed below.

Chunk table 316 also includes fields 320 to store a data offset, in bytes, which is associated with the location of the particular blocks of data within data chunk structure 300. Since data block 312 is the first data block within data chunk structure 300, the data offset associated with data block 312 can be 0. Data block 314 is stored next to data block 312 within the data chunk structure. In this particular example, the size of data block 312 is 64 bytes, therefore the data offset associated with data block 314 is 64 (bytes). Data chunk structure 300 further includes fields 322 which can be used to associate a particular data chunk structure 300 with a chunk identifier (ID). The chunk ID is identical across systems which store the same data chunk for the history data, and uniquely identifies the data chunk. Based on a known block signature, a piece of data can be efficiently located (or determined to be absent) within a particular data chunk structure, by looking for one or more block signatures that match the known signature. Although not shown in FIG. 3A, each data chunk structure 300 can also be associated with a timestamp, and a search can start on a data chunk structure, designated as the working history data chunk, which is most recently updated. Although as FIG. 3A shows that a number string is used as chunk ID, it is understood that any combination of numbers, symbols, or alphabets can be used as chunk ID.

FIG. 3B is a block diagram illustrating an exemplary memory chunk table 350 for facilitating searching of history data according to embodiments of the present disclosure. Memory chunk table 350 can facilitate a search for a piece of data among each of the history data chunks (e.g. as stored according to data chunk structure 300 of FIG. 3A) currently stored in a volatile memory (e.g. memory 114 of FIG. 1). As shown in FIG. 3B, memory chunk table 350 includes fields 352 to store chunk IDs where each chunk ID identify a data chunk structure in the memory. For each data chunk structure identified by fields 352, memory chunk table 350 further includes fields 354 and 356 to associate, respectively, a block signature that represent a particular data block, and the location of that data block, within the data chunk structure. Based on a known signature, a piece of input data can be efficiently located (or determined to be absent) among a set of data chunk structures stored in a memory, by looking for one or more block signatures that matches the known signature. If the input data is located in a particular data chunk structure, the chunk ID associated with that particular data chunk structure and the location of the data within that data chunk structure can be retrieved. In some embodiments, the retrieved chunk ID and location information can be used for a second, and more refined, search, as to be discussed in detail below. Whether or not such a second search is needed depends on how the block signature is calculated—if the block signature cannot uniquely identify the data (i.e. different data values can generate the same block signature), a second search may be needed to ensure that the data blocks located within that data chunk structure are truly identical to the input data, such that a reference token generated henceforth accurately represents the input data.

FIG. 3C is a block diagram illustrating an exemplary disk chunk table 370 for facilitating searching of history data according to embodiments of the present disclosure. Disk chunk table 370 can facilitate a search for a piece of data among each of the history data chunks (e.g. as stored according to data chunk structure 300 of FIG. 3A) currently stored in a non-volatile storage device (e.g. storage device 116 of FIG. 1). As shown in FIG. 3C, disk chunk table 370 includes fields 372 to store chunk ID, where each chunk ID identify a data chunk structure representing a chunk of data in the storage device. For each data chunk structure identified by fields 372, disk chunk table 370 further includes fields 374 to store a disk signature, which is generated to represent the content of multiple data blocks stored in the storage device.

In some embodiments, tables 316, 350 and 370 provide a hierarchical structure for search of history data organized as data chunk structures 300 (hereinafter "history data chunks"). To locate a piece of data in the history data, the search can start with the most recent history data chunk currently that is loaded into the memory (designated as the working history data chunk), by looking up for one or more blocks with block signatures matching with the signatures of the data, based on table 316 associated with the working history data chunk. If the data cannot be found, the scope of the search can then be expanded to every history data chunk currently being loaded into the memory, based on the information from table 350. It can be desirable to first confine the search within the memory for a few reasons. First, it is more likely that the data stored in the memory includes the latest update (e.g., with data added as a result of compression or decompression), and therefore the likelihood of finding the piece of data can become higher. Second, accessing data from the memory is also typically faster than accessing data from the storage device, which speeds up the search. Therefore, the search can start with the history data chunks currently stored in the memory.

If the piece of data cannot be located in the memory, the search can then be performed at the history data chunks stored in the storage device with information from table 370. If a match is found based on the disk signature, the history data chunk with a chunk ID associated with the matching disk signature can be loaded into the memory, and a more refined search based on block signatures can then be conducted on newly-loaded history data chunk using information from the associated table 316.

Figure 4A:
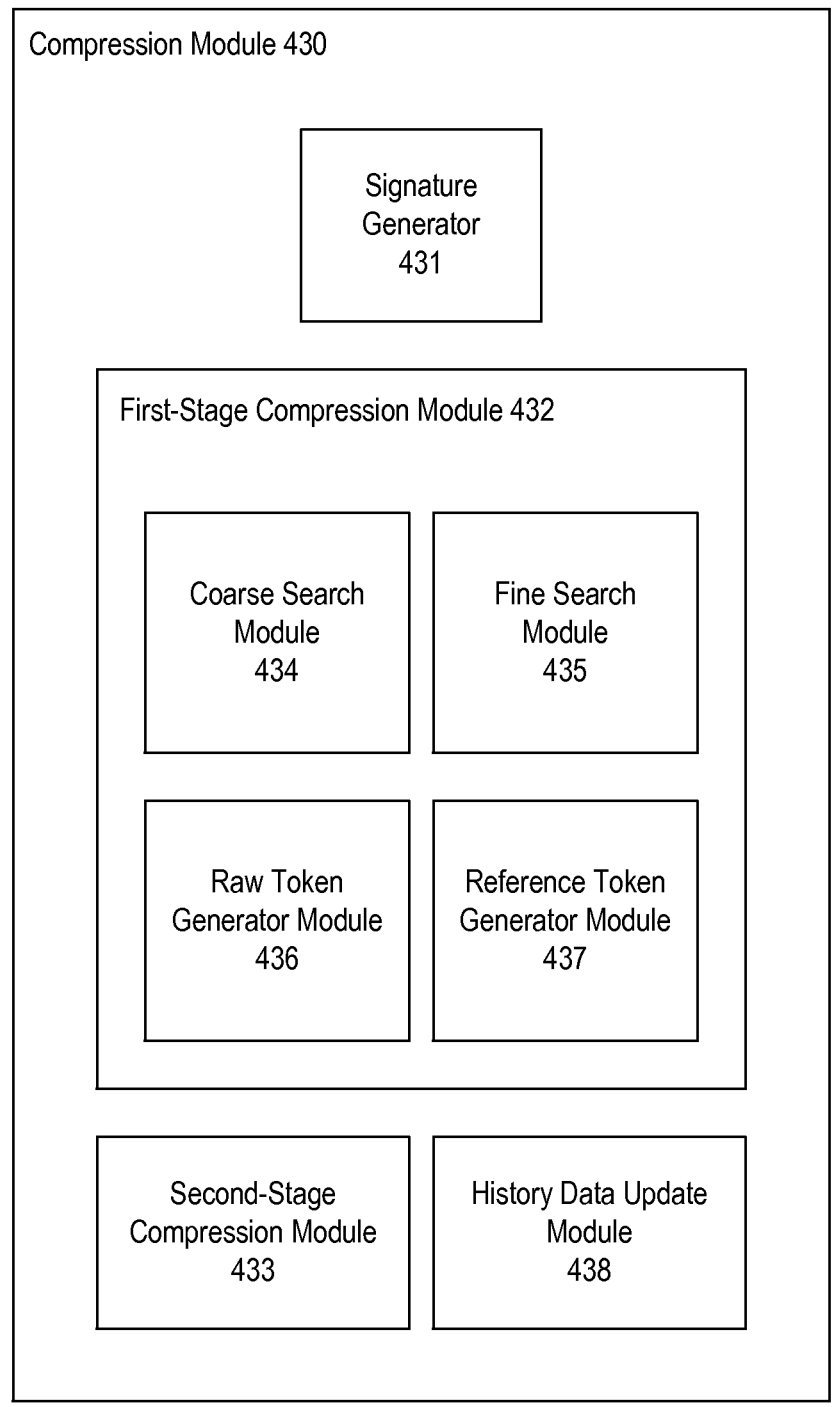
FIG. 4A is a block diagram illustrating an exemplary compression module according to embodiments of the present disclosure.

FIG. 4A is a block diagram illustrating an exemplary compression module 430 according to embodiments of the present disclosure. In some embodiments, compression module 430 provides functionalities similar to those of data compression module 230 of FIG. 2. Compression module 430 includes a signature generator 431, a first-stage compression module 432 and a second-stage compression module 433. First-stage compression module 432 further comprises a coarse search module 434, a fine search module 435, a raw token generator module 436, and a reference token generator module 437.

As compression module 430 receives input data, the data can be processed by signature generator 431 to generate one or more block signatures, where a block signature is associated with each consecutive data block with size of, for example, 64 bytes. Further details about the generation of block signatures will be discussed below.

After at least a block signature is generated for the input data, the generated block signature and the input data can be passed to coarse search module 434 of first-stage compression module 432. Based on the generated block signature, the coarse search module can search for a matching block signature at a particular history data chunk (for example, the working history data chunk) based on, for example, information from the chunk table 316 associated with the working history data chunk. In some embodiments, coarse search module can perform a hierarchical search of the history data chunks stored in the memory and in the storage device using information from, for example, tables 316, 350, and 370 of FIGS. 3A-3C. If a match is found, which may indicate a high likelihood that an exact copy of the input data (or portion thereof) can be found in the working history data chunk, the input data and the data offset associated with the data block with the matching block signature, within the working history data chunk, can then be passed to fine search module 435.

At fine search module 435, a more precise search for the input data within the working history data chunk can be carried out. In some embodiments, such a search may be conducted to ensure that the data blocks located within that working history data chunk are truly identical to the input data. Based on the data offset, fine search module 435 can read the data block, and carry out an exact byte-string comparison against the input data, to make sure that the input data matches exactly with the data block. Fine search module 435 can also expand the scope of comparison in both forward and backward directions, by reading data blocks (or portions thereof) from the working history data chunk in front of and behind the location indicated by the data offset, in order to maximize the number of data blocks that match with a portion of the input data of the same size. After locating the maximum number of matching data blocks within the working history data chunk, the corresponding portion of the input data can be represented by a reference token which indicates the location and the number of matching data block (or a length of the matching data as part of the data blocks) within the history data chunk. In some embodiments, the reference token also includes the chunk ID associated with the working history data chunk. The reference token can be generated by reference token generator module 437 and added to a token stream representing the input data.

On the other hand, for the portion of the input data where either coarse search module 434 fails to find a matching block signature, or fine search module 435 fails to find a piece of data that matches exactly that portion of the input data despite the fact that a matching block signature was found, such a portion of the input data will then be represented by raw tokens. In some embodiments, raw tokens include a copy of that portion of input data. The raw token can be generated by raw token generator module 436 and added to the token stream representing the input data. In some embodiments, compression module 430 further includes a history data update module 438, which adds the input data to the history data accessible by compression module 430, and updates at least one of memory chunk table 350 and disk chunk table 370 with the block and/or disk signatures generated for the input data.

After first-stage compression module 432 generates at least one token for the token stream, the generated token stream can then be passed to second-stage compression module 433 to further compress the token stream. In some embodiments, second-stage compression module 433 can employ a loseless data stream compression algorithm to carry out the compression. The compressed token stream can then be used to represent the input data in a compressed state.

Figure 4B:
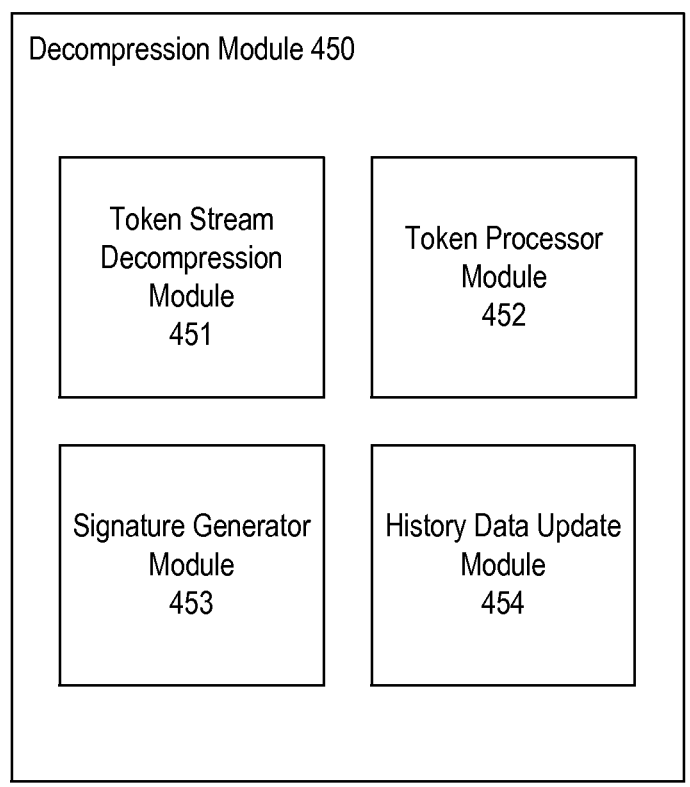
FIG. 4B is a block diagram illustrating an exemplary decompression module according to embodiments of the present disclosure.

FIG. 4B is a block diagram illustrating an exemplary decompression module 450 according to embodiments of the present disclosure. In some embodiments, decompression module 450 provides functionalities similar to those of data decompression module 250 of FIG. 2. Decompression module 450 includes a token stream decompression module 451, a token processor module 452, a signature generator module 453, and a history data update module 454. Token stream decompression module 451 can receive a compressed token stream from, for example, compression module 430, and perform decompression according to the compression algorithm employed by second-stage compression module 433 of compression module 430, to recover the token stream. The recovered token stream can then be processed by token processor module 452, which can identify one or more reference tokens and/or raw tokens from the token stream. With reference tokens, token processor module 452 can locate a working history data chunk (e.g. the chunk that is most recently updated, or a chunk identified by the chunk ID information transmitted as part of the reference token) from the history data accessible by decompression module 450 and, based on the location information and size of matching data information included in the reference tokens, extract the portion of history data represented by the reference tokens. Token processor module 452 can also retrieve the portion of input data (provided to compression module 430) included in the raw tokens. Based on the token stream, token processor module 452 can then reconstruct a data stream that is identical to the input data. The reconstructed data stream can then be passed to signature generator module 453, which generates block and/or disk signatures for the reconstructed data stream. History data update module 454 can also add the reconstructed data stream to the history data accessible by the decompression module 450, so that it matches with the history data accessible by compression module 430, and updates at least one of memory chunk table 350 and disk chunk table 370 with the block and/or disk signatures generated for the reconstructed data.

Figure 5A:
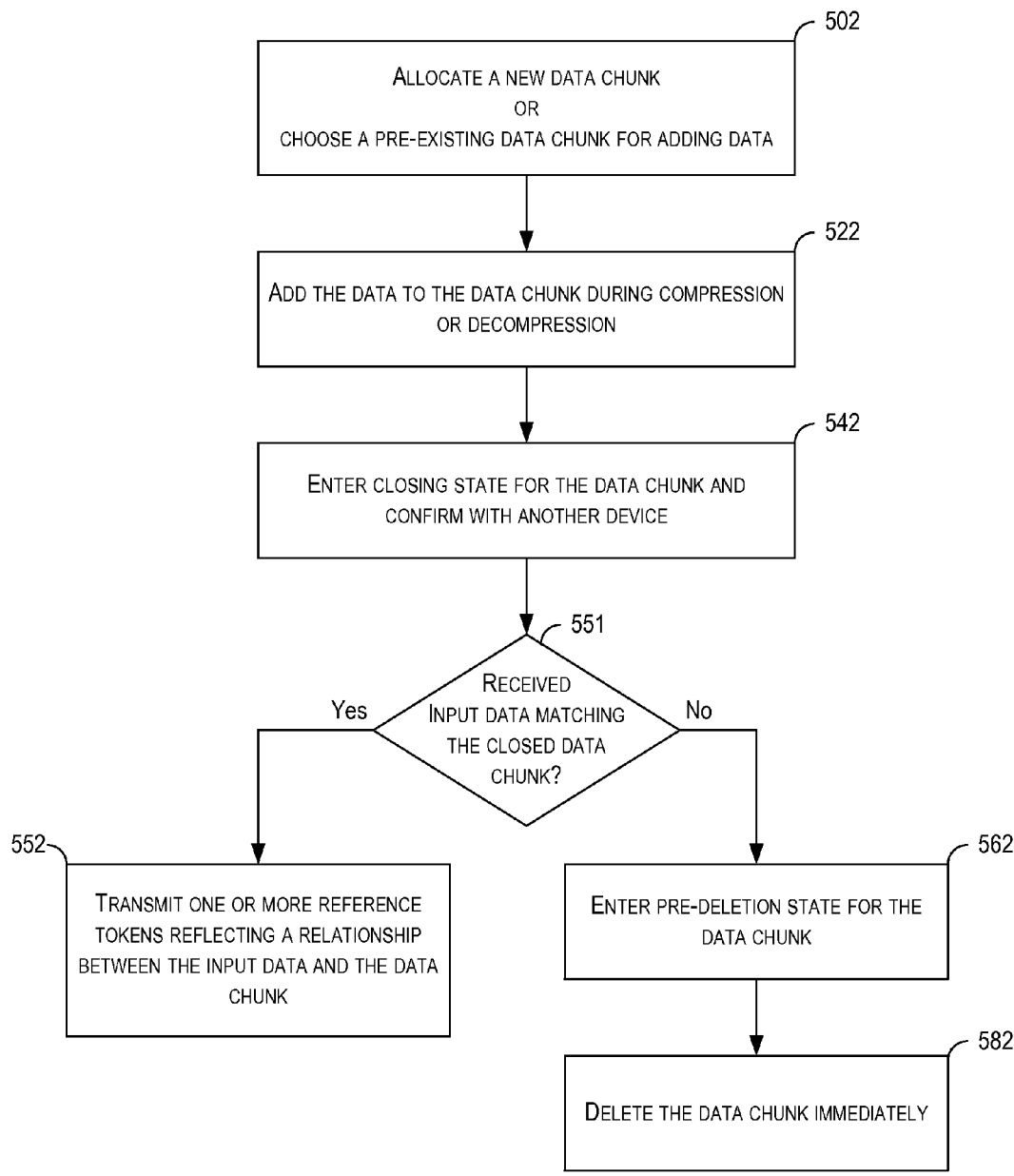

FIG. 5A is a flowchart illustrating an exemplary method 500 of generating and deleting a data chunk according to embodiments of the present disclosure. The data chunk can be represented by data chunk structure 300 of FIG. 3, and can be part of history data being accessed and/or updated by data compression module 430 of FIG. 4A and by decompression module 450 of FIG. 4B. In some embodiments, method 500 can be implemented by, for example, history data manager 270 of FIG. 2 operating on an electronic device (e.g., computer system 110 of FIG. 1). While the following flowcharts disclose steps in a particular order, it will be appreciated that at least some of the steps can be moved, modified, or deleted where appropriate, consistent with the teachings of the present disclosure. And while the steps are indicated as being performed by an electronic device, it is appreciated that the steps can be performed by more than one electronic device.

In step 502, the electronic device (e.g., a data compression device) allocates a new data chunk, or chooses a pre-existing data chunk, for adding data. There can be various events that lead to allocation of a new data chunk. For example, data compression module 430 receives input data and, finding that the input data does not match with any portion of the history data, determines to add the input data to the history data. A new data chunk can then be allocated to store the input data. Moreover, data decompression module 450, after receiving raw tokens, can also determine to add the data included in the raw tokens to history data, and a new data chunk can also be allocated.

Step 502 may include a number of sub-steps. Reference is now made to FIG. 5B, which illustrates an exemplary method 503 which can be part of step 502 of FIG. 5A. After a compression device 550 (e.g., an electronic device on which compression module 430 is operating) executes step 504 to allocate a compression data chunk, the device then executes step 505 to generate a new chunk ID and associate it with the new compression data chunk. The compression device can then execute step 506 to generate the first token, and then execute step 507 to transmit the chunk ID with the first token to a decompression device 560 (e.g., an electronic device on which decompression module 450 is operating). After receiving the chunk ID, the decompression device can execute step 508 to also allocate a new decompression data chunk, and then associate the newly allocated data chunk with the received chunk ID. As a result, a pair of compression-decompression data chunk, associated with a chunk ID, is created. The management of chunk IDs will be described in detail below. During typical operation, a chunk ID will be uniquely associated with the pair of compression and decompression data chunks, and the data chunks are supposed to store identical data.

On the other hand, the electronic device may also select a pre-existing chunk that was allocated earlier and that is currently not being updated. In some embodiments, the data chunk may be selected based on a timestamp associated with it. For example, a data chunk that is updated most recently may be selected. The data chunk that is selected or newly allocated for accepting new data will be designated as the working data chunk.

Figure 5C:
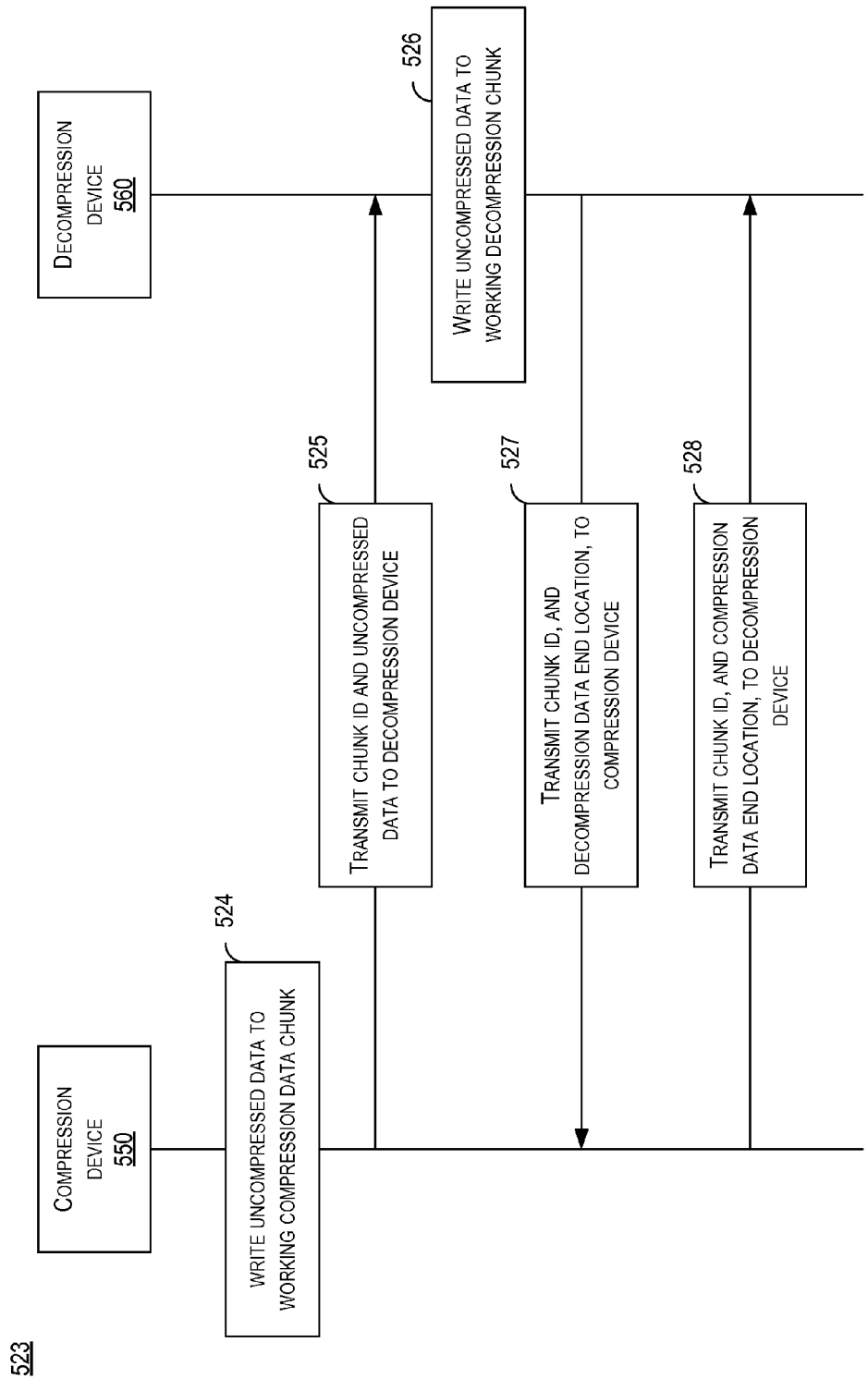

Referring back to FIG. 5A, after a working data chunk is allocated or selected in step 502, the electronic device then proceed to step 522 to add the input data to the data chunk during compression or decompression. Step 522 can include a number of sub-steps. Reference is now made to FIG. 5C, which illustrates an exemplary method 523 which can be part of step 522 of FIG. 5A. Compression device 550, after receiving input data, writes the uncompressed data to the working compression data chunk in step 524. Compression device 550 then transmits the uncompressed data (in raw tokens) and the chunk ID of the working compression data chunk to decompression device 560, in step 525. After decompression device 560 receives the uncompressed data and the chunk ID, it can write the uncompressed data to its corresponding working decompression data chunk in step 526.

In some embodiments, in a case where a newly allocated data chunk is chosen, the input data can be added at the first byte of the space allocated for the chunk data. On the other hand, if a pre-existing data chunk is chosen, the new data is added at a new data start location which reflects a size and an end location of the pre-stored data in the pre-existing data chunk. In some embodiments, the new data start location is confirmed between the compression and the decompression devices after, as to be discussed below, the pre-existing data chunk enters a confirming state when the previous updating to the pre-stored data has finished. In some embodiments, after the data is added, the end location of the updated data can be confirmed again between compression and the decompression devices. With such arrangements, the compression and the decompression device can add identical data, respectively, at the same relative location to a compression data chunk and a decompression data chunk, and the two updated data chunks can then store identical data. This allows the compression device to generate reference tokens based on a relationship between the input data and the data stored in the compression data chunk, and transmit the reference tokens to the decompression device, with the expectation that the decompression device has a decompression data chunk that stores identical data as the compression data chunk, and can reconstruct the input data from the reference tokens and the data stored in the decompression data chunk.

In some embodiments, the aforementioned confirmation can be carried out by exchanging of messages between the compression and the decompression devices. For example, after the decompression device updates its decompression data chunk with data in step 526, it can execute step 527 to transmit a message which includes the new data end location of the updated decompression data chunk, and its associated chunk ID, to the compression device. Moreover, the compression device can also execute step 528 to transmit a message which includes the new data end location of the updated compression data chunk, and the associated chunk ID, to the decompression device. In some embodiments, the messages can be generated by either device whenever a certain number of bytes of input data are added to the data chunk. The compression and decompression devices need not wait until the end of the addition of the new data to exchange the messages.

Each device can then compare the new data end location of the data chunk that it is operating on, against the received new data end location from the other device. If the two new data end locations matches, the new data end locations are confirmed, and all the data within each data chunk up to the confirmed new data end locations can be used for generation of reference tokens (by compression device), or for processing of received reference tokens (by decompression device). On the other hand, one of the devices (e.g., the compression device) may also determine the other device (e.g., the decompression device) exhibits unexpected behaviors, which signals that there can be a discrepancy between the history data stored in the compression and the decompression devices, and the determination may or may not be based on the comparison result.

Figure 5D:
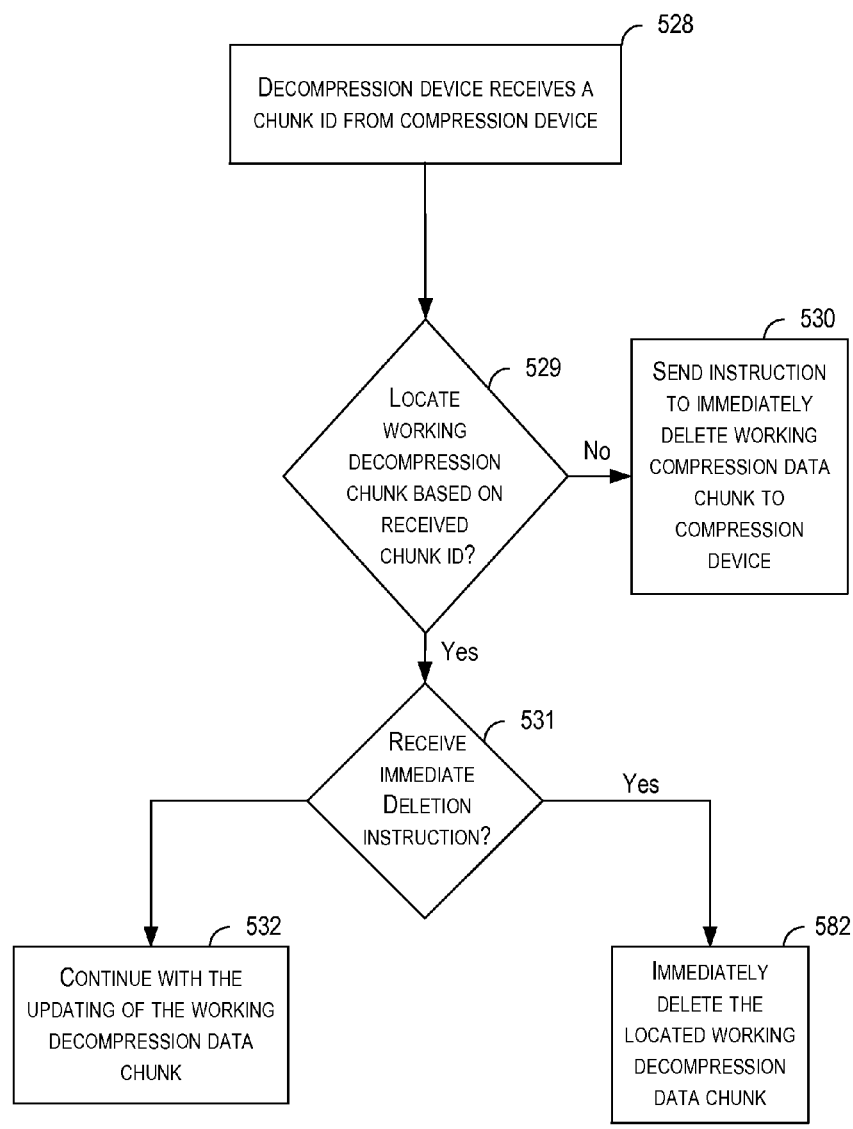

Reference is now made to FIG. 5D, which illustrates an exemplary method 527 which can be executed by the decompression device as part of the confirmation process during the updating of the decompression data chunk in step 522 of FIG. 5A. The decompression device first receives a chunk ID associated with a working compression data chunk from the compression device in step 528. The decompression device then executes step 529 to determine whether it can locate a corresponding working decompression chunk based on the received chunk ID. If it fails to locate the working chunk, it can execute step 530 to send an instruction to the compression device to immediately delete the working compression data chunk. On the other hand, after locating the working decompression chunk, the decompression device will execute step 531 to determine whether it has received an immediate deletion instruction from the compression device (to be discussed below). If such an instruction is not received, the decompression device will execute step 532 to continue with the updating of the working decompression data chunk. If such an instruction is received, the decompression device will execute step 582 (also shown in FIG. 5A) to immediately delete the located working decompression data chunk. As part of step 582, the deleted chunk is also removed from all hash tables (e.g. memory chunk table 350 and disk chunk table 370 of FIG. 3) so that the data chunk will not be accessed for further compression or decompression.

Figure 5E:
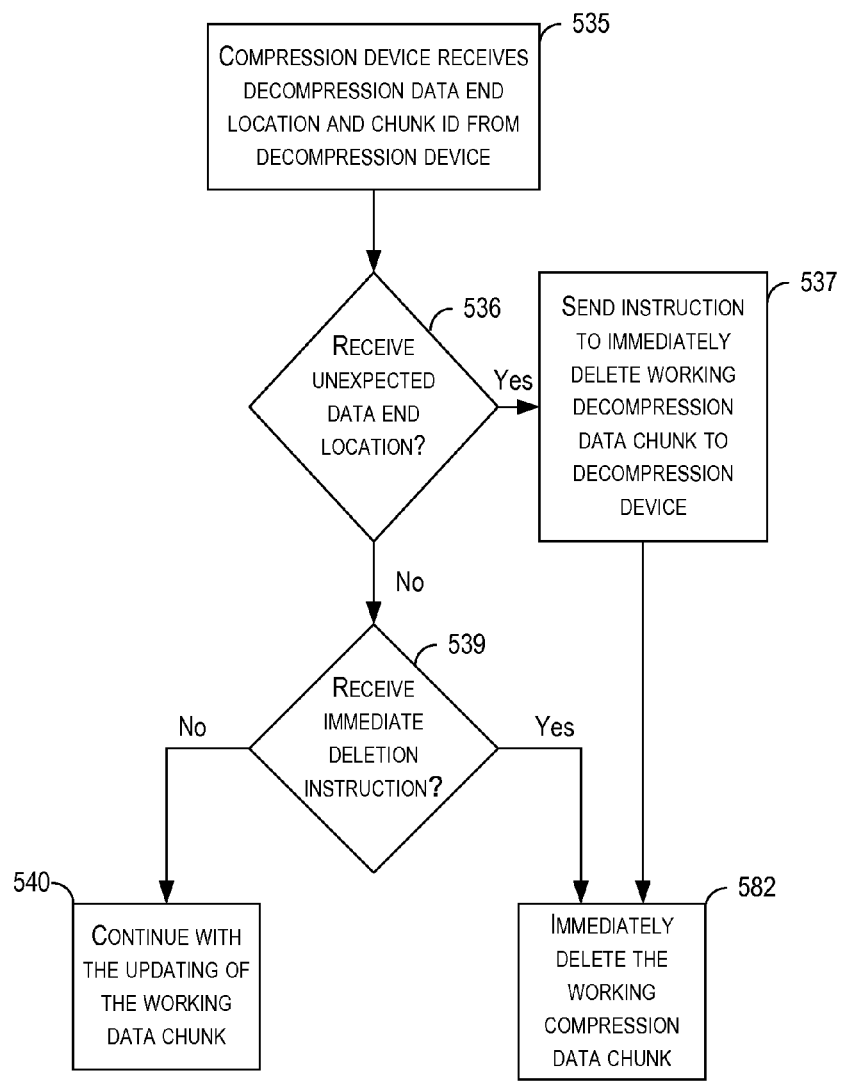

Reference is now made to FIG. 5E, which illustrates an exemplary method 534 which can be executed by the compression device as part of the confirmation process during the updating of the compression data chunk in step 522 of FIG. 5A. The compression device first receives a new data end location of the working decompression data chunk, and its associated chunk ID, from the decompression device in step 535. The compression device then executes step 536 to determine whether an unexpected data end location has been received. For example, a compression device may also not expect to receive a new data end location, from the decompression device, that is smaller than the end location of the pre-stored data in its compression data chunk (i.e. before the data is added), because the new data is to be added sequentially after the pre-stored data. Moreover, the compression device may also expect the new data end location received from the decompression device to be smaller than its own new data end location (e.g., if the decompression device is not yet finished with the addition of the data), or equal to its own new data end location (e.g., if the decompression device has finished the addition of the data). Such unexpected behaviors can occur for various reasons. As an illustrative example, the decompression device may have added new data to its working decompression data chunk and have transmitted a message which includes the new data end location of the updated decompression data chunk (e.g. by executing step 527 of FIG. 5C), but the message was lost in the network, and the compression device cannot confirm the new data end location at the decompression data chunk, or whether the new data the decompression device receives matches with what the compression devices sent. As a result, there can be discrepancy in the history data stored by both devices, and the discrepancy will persist when any of the chunks is selected to store more data.

After determining that an unexpected data end location is received in step 536, the compression device can execute step 537 to send an instruction to the decompression device to delete the working decompression data chunk, and then execute step 538 to delete its corresponding working compression data chunk. If the received data end location conforms with expectation, the compression device will then execute step 539 to determine whether it has received a deletion instruction from the decompression device, and if such an instruction is not received, it will execute step 540 to continue with the updating of the working decompression data chunk. On the other hand, if an immediate deletion instruction is received from the decompression device, it will execute step 582 to immediately delete the working compression data chunk. Otherwise, the compression device will execute step 540 to continue with the updating of the working compression data chunk.

With such arrangements, the likelihood of generating reference tokens, by the compression device, based on history data that the decompression device does not have, can be reduced.

Referring back to FIG. 5A, after the data is added to the working data chunk and the new end data locations are confirmed, the electronic device can execute step 542 to enter a closing state, which prepares the data chunk to become a closed data chunk. A data chunk can become a closed data chunk when it is not currently (or capable of) accepting new data. Various situations can lead to entering the closing state. For example, the data chunk, being of fixed-size, has been filled up of data. The compression device or the decompression device may also choose to update or read a different data chunk, causing a currently open chunk to enter the closing state. When a compression data chunk enters the closing state, the corresponding decompression data chunk (i.e. the chunk associated with the same chunk ID) should also enter the closing state, and vice versa. Moreover, the compression and decompression devices can also confirm that the data chunk pairs stores identical data and has been updated in the same manner before being closed, which can be achieved by exchanging of messages between the compression and the decompression devices to confirm that both members of the working compression and decompression data chunk pair are entering the closing state, and to confirm that both are in the condition to become closed.

Figure 5F:
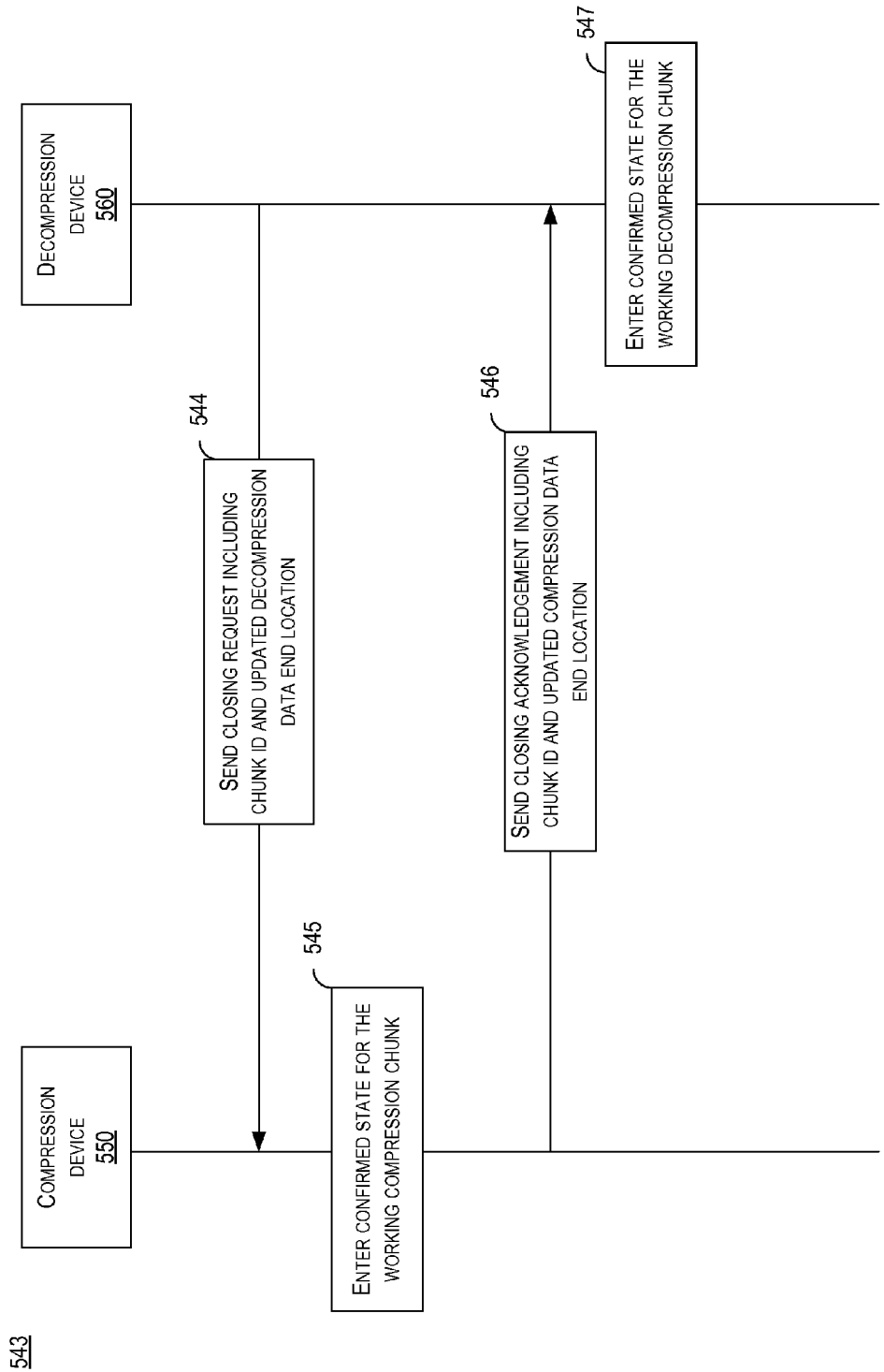

Reference is now made to FIG. 5F, which illustrates an exemplary method 543 which can be part of the confirmation process in step 542 of FIG. 5A. After a decompression device enters the closing state for a decompression data chunk, it may execute step 544 to transmit a request to a compression device signaling that it is entering the closing state for a decompression data chunk. The request can also include the chunk ID associated with the decompression data chunk, and the updated data end location of the decompression data chunk. If the compression device determines that the received data end location matches its own, it can execute step 545 to enter a confirmed state for the compression data chunk, and the compression data chunk can become closed. Moreover, if the compression device has also entered the closing state, it can also execute step 546 by transmitting an acknowledgment, in response to the request received from step 544, back to the decompression device signaling that it is also entering the closing state for the corresponding compression data chunk associated with the received chunk ID. The acknowledgment can also include the chunk ID, and the updated data end location of the compression data chunk. If the decompression device determines that the received data end location matches its own, it can execute step 547 to enter a confirmed state for the decompression data chunk, and the decompression data chunk can also become closed. In some embodiments, multiple identical requests and acknowledgements can be sent to avoid them being lost while being transmitted, and the devices can ignore the requests or the acknowledgments after they have entered the confirmed state for the concerned data chunk.

As discussed above, the confirmed new data end locations of closed data chunks can be used as start locations for adding the next new data, when the closed chunks are opened to accept the next new data. Moreover, closed chunks that are full or cannot take in additional data can also be swapped out from the memory into a non-volatile storage device, and can later then loaded back into the memory if, as described above, the compression device determines a match based on disk signature while searching for history data.

On the other hand, if the new data end locations of the data chunk pair do not match, one of the devices may determine that the other device exhibits unexpected behavior which, as described before, may signal a discrepancy between the history data stored in the compression and the decompression devices. In response, the device may send an instruction to the other device to delete the other device's data chunk that is in the closing state, and its own corresponding data chunk. Also, even if the new data end locations are determined to be matching, any time a device receives a deletion instruction, the device will also delete the data chunk referred to by the instruction.

Closed data chunks, with data end locations confirmed between the compression and decompression devices, can then be used either by the compression device or by the decompression device. The compression device can execute step 551 to determine whether the received input data matches the closed data chunk. The determination can be made by, for example, first-stage compression module 432 of FIG. 4A as discussed earlier. If a match is found, the compression device can then execute step 552 to transmit one or more reference tokens reflecting a relationship between the input data and the closed data chunk. Such a relationship can be, for example, a size and a location of data stored in the closed data chunk that is identical to the input data. Moreover, the decompression device can also use the closed data chunk to reconstruct input data from received tokens (not shown in FIG. 5A).

On the other hand, if a match is not found, the closed data chunk may need to be deleted at some time to conserve limited resources. In this situation, both devices may select one or more closed chunks for deletion. In some embodiments, the selection for deletion can be based on a timestamp associated with the chunk, in order to delete the chunks in the chronological order. Moreover, when one member of a compression-decompression data chunk pair (i.e., both associated with the same chunk ID) is deleted, the other member of the pair needs to be deleted as well, to avoid discrepancy between the history data stored in both devices. Moreover, it is also desirable to confirm that the data chunk being selected is not being currently accessed (or soon to be accessed) by one of the devices, to avoid creating disruption to the compression or decompression undergone by that device. Referring back to FIG. 5A, these can be achieved when both the compression device and the decompression device enters a pre-deletion state in step 562, before the closed data chunk is deleted and removed from all the hash tables in step 582.

Figure 5G:
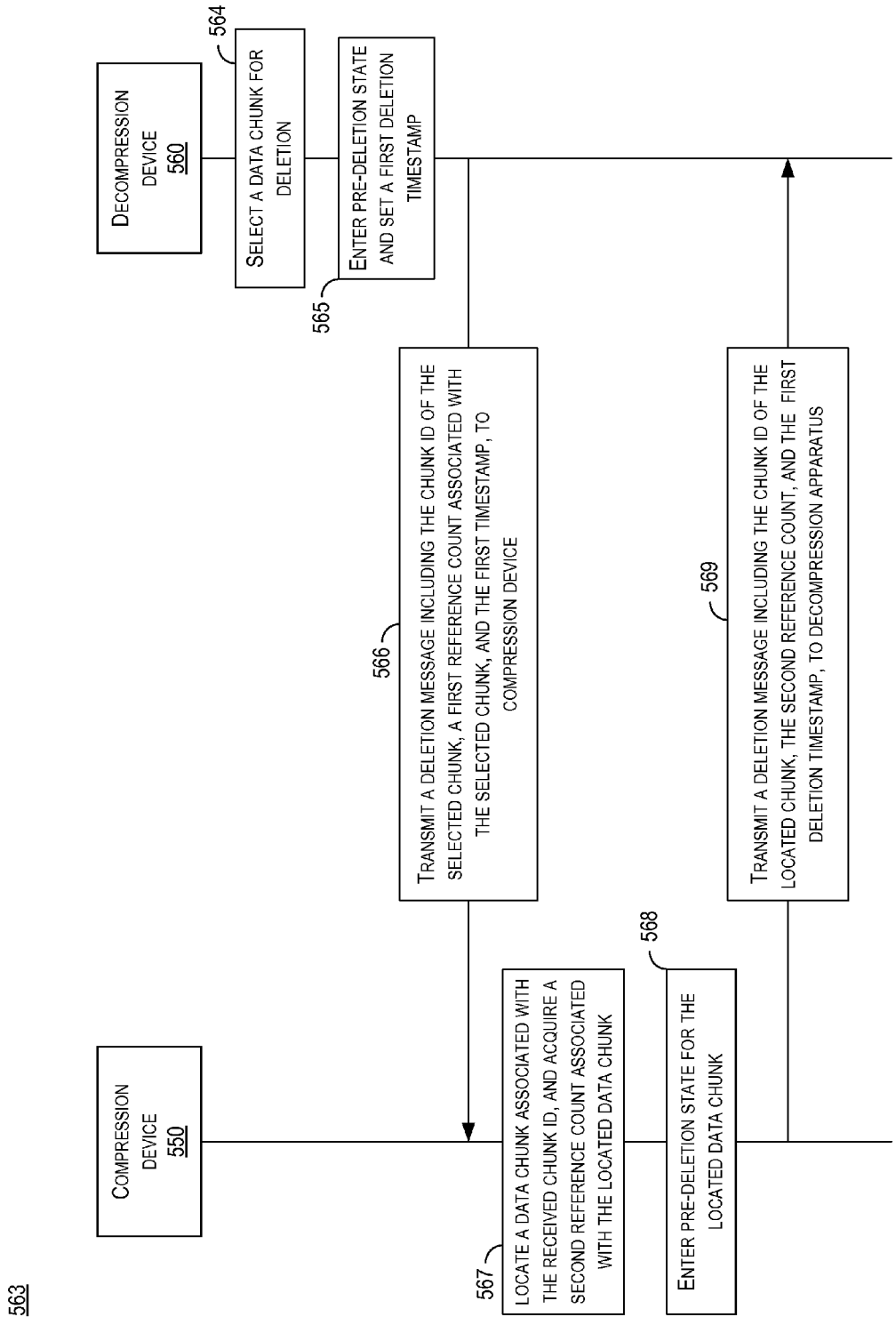

In some embodiments, step 562 further includes a number of sub-steps, where the compression and decompression devices exchange messages to confirm that the selected data chunk is ready to be deleted. Reference is now made to FIG. 5G, which illustrates an exemplary method 563 which can be part of the entry of pre-deletion state in step 562 of FIG. 5A. The decompression device first executes step 564 to select a data chunk for deletion. The selection can be based on a timestamp associated with the data chunk (e.g., being oldest). The decompression device also enters the pre-deletion state for the selected data chunk, and sets a first deletion timestamp, which indicates a time no later than which the selected data chunk is to be deleted, in step 565.

In some embodiments, the decompression device may also associate a first reference count with the selected data chunk. The first reference count indicates a number of times the selected data chunk has been accessed to process reference tokens. The compression device may also associate a second reference count with the corresponding data chunk which indicates a number of times the corresponding data chunk has been accessed to generate reference tokens. Under normal operation, the two references counts should be identical for the processing of any given input data portion, as the compression device access a data chunk for a number of times to generate reference tokens, and the decompression device should access the corresponding data chunk for the same number of times to completely process the reference tokens to reconstruct the given input data portion. In some embodiments, the compression and decompression devices may require the two reference counts associated with a data chunk to match before allowing the data chunk to be deleted, to reduce the likelihood of deleting a data chunk that is being accessed (or soon to be accessed) for compression or decompression.

After the first deletion timestamp and the first reference count are generated, the decompression device can execute step 566 to transmit a deletion message to the compression device to signal that it is entering pre-deletion state. The message may include the chunk ID to the selected data chunk, the first reference count, and the first deletion timestamp. After the compression device receives the message, it will execute step 567 to locate the data chunk associated with the received chunk ID and acquire the second reference count associated with the located data chunk, and then execute step 568 to enter the pre-deletion state for the located data chunk. The compression device can then execute step 569 to transmit a deletion message back to the decompression device to signal that it is also entering the pre-deletion state, and the message also includes the chunk ID of the located chunk, the second reference count, and the first deletion timestamp. In some embodiments, each device, after receiving a timestamp from the other device, compares the received timestamp against its own and adopts the timestamp which expires earlier.

Figure 5H:
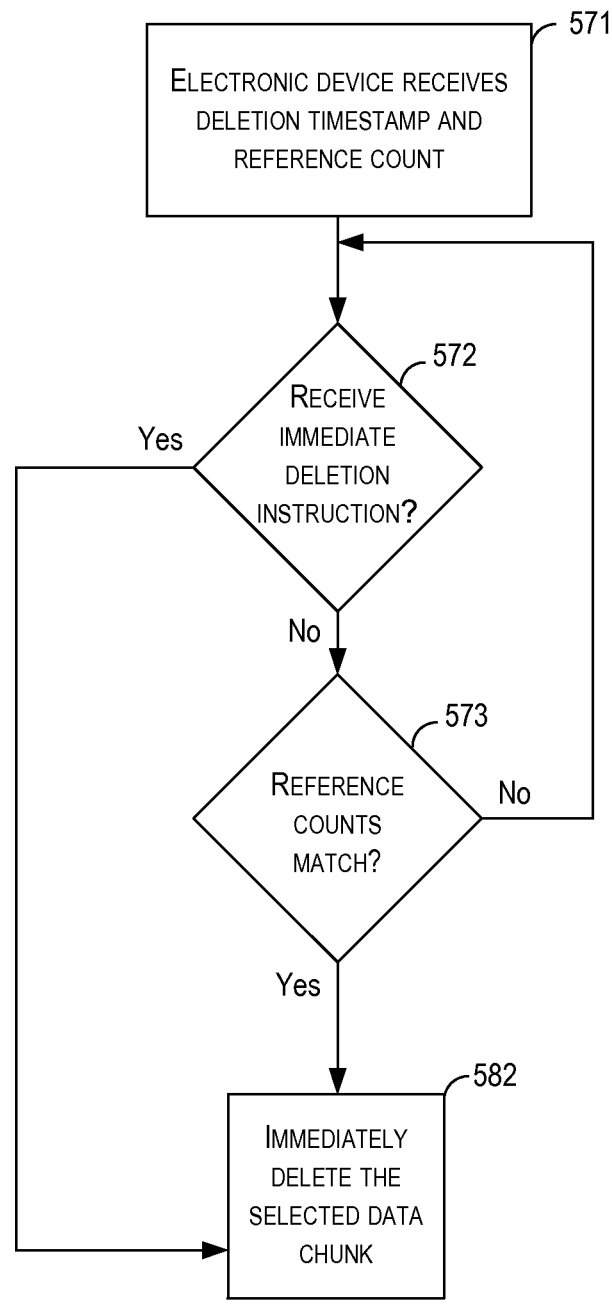

After receiving the deletion message signaling entry of the pre-deletion state, each device may further execute a number of steps before deleting the selected data chunk. Reference is now made to FIG. 5H, which illustrates an exemplary method 570 which can be executed after each device receives the deletion message. The electronic device (either compression device or decompression device) first receives a deletion timestamp and a reference count associated with the selected data chunk in step 571. The electronic device then checks whether an immediate deletion instruction has been received in step 572. Receiving such an instruction is possible during the pre-deletion state if, for example, a device fails to locate a data chunk based on the received chunk ID, and may send an immediate deletion instruction to the sender device to immediately delete the data chunk referred to by the chunk ID. If such an instruction is received, the device will proceed to step 582 (also shown in FIG. 5A) to delete the selected data chunk immediately. If such instruction is not received, the device can then check whether the received reference count matches its own reference count for the data chunk, in step 573. If the reference counts matches, the device will proceed to step 582 to delete the data chunk. If not, the device will check whether the time indicated by the received timestamp (or its own timestamp if it expires earlier) is reached. If it is, the device will also proceed to step 582 to delete the data chunk. Otherwise, the device will go back to step 572, until the selected data chunk is deleted.

Figure 6A:
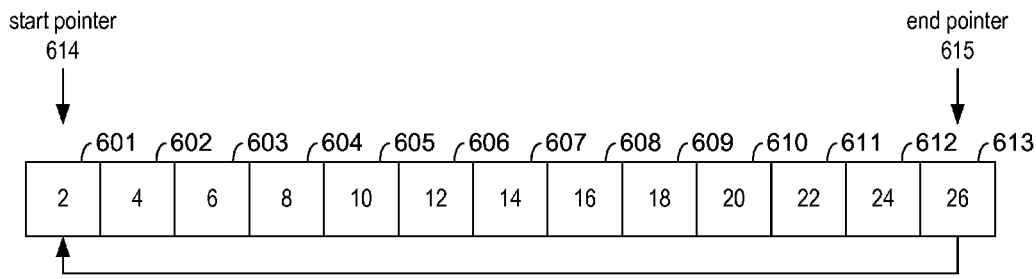
FIGS. 6A-6C are block diagrams illustrating an exemplary buffer for management of data chunk identifiers according to embodiments of the present disclosure.
Figure 6B:
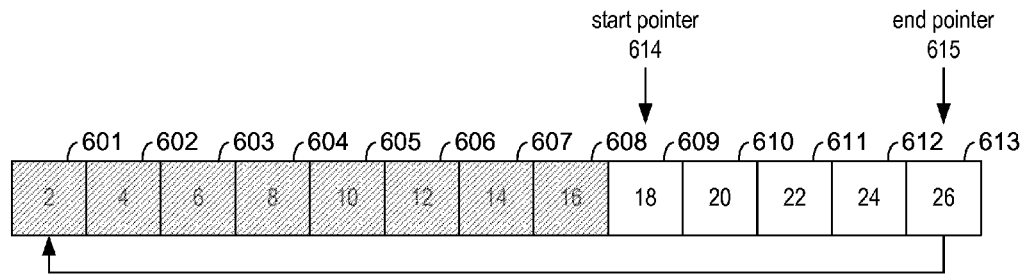
Figure 6C:
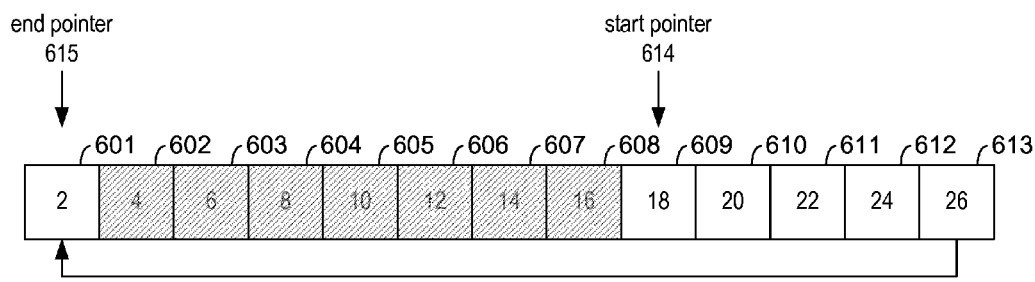

FIGS. 6A-6C are block diagrams illustrating an exemplary buffer 600 for management of chunk ID according to embodiments of present disclosure. As shown in FIG. 6A, buffer 600 includes entries 601 to 613, each storing a number. Each entry can be either assigned (marked with opaque color as shown in FIGS. 6B and 6C), meaning that the number stored in the entry has been assigned to a newly allocated data chunk as a chunk ID, or unassigned. The chunk ID is to be used to associate with a compression-decompression data chunk pair. In some embodiments, odd or even numbers are used for the chunk IDs, and a determination about whether to use odd or even numbers can be based on, for example, a globally unique identifier associated with the hardware on which the buffer is managed. In some embodiments, the globally unique identifier can be derived from, for example, the media access control (MAC) address associated with the hardware. Although FIGS. 6A-6C show that a list of monotonically increasing even numbers are stored, it is understood that any ordering of numbers, alphabets or symbols can be stored in the buffer and used as chunk ID.

In some embodiments, buffer 600 can have a circular structure, with entries 601 and 613 also being neighboring entries. Buffer 600 further includes a start pointer 614 and an end pointer 615. The pointers can be configured to indicate a group of entries that are unassigned. The pointers can take in any form, such as a number or an address, and can be maintained by any suitable data structure (e.g., a mapping table between the number stored and the pointers). In some embodiments where monotonically increasing (or decreasing) numbers are stored in the buffer, the number can be used as the pointers.

Figure 7:
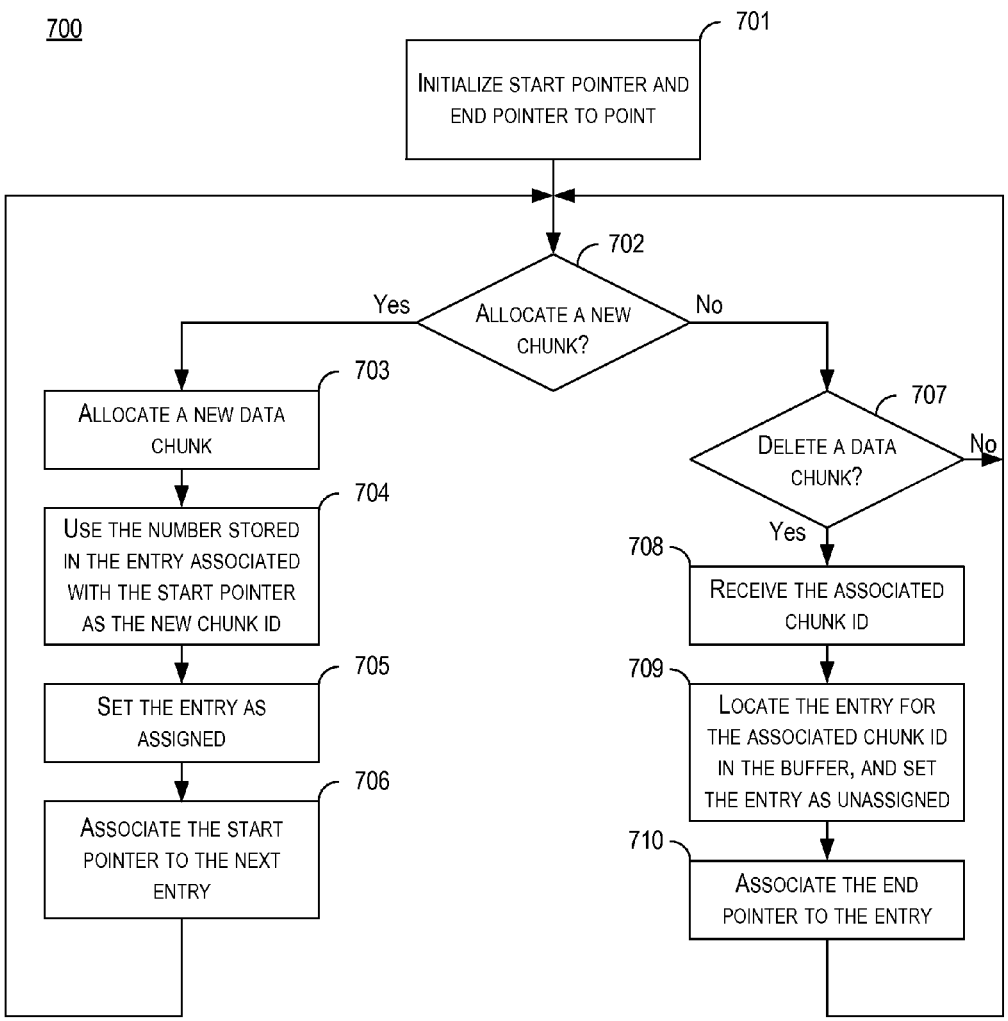
FIG. 7 is a flowchart illustrating an exemplary method of managing data chunk identifiers according to embodiments of the present disclosure.

Reference is now made to FIG. 7, which illustrates a method 700 of managing chunk IDs for allocation and deletion of data chunks implemented by, for example, history data manager 270 of FIG. 2. When buffer 600 is newly created, step 701 can be executed to initialize start pointer 614 to associate with entry 601, and end pointer 615 to associate with entry 613. The initialization of the pointers are illustrated in FIG. 6A.

Referring back to FIG. 7, after history data manager 270 determines to allocate a new data chunk in step 702 (e.g., a compression device cannot find a match in the chunk tables and determines to generate raw tokens, or a decompression device just receives raw tokens), a new data chunk can be allocated in step 703. The number stored in the entry currently associated with start pointer 614 can be used as a new chunk ID to be associated with the new data chunk in step 704, and the entry becomes assigned in step 705. In some embodiments, entries are assigned sequentially, and start pointer 614 is assigned to the next entry in step 706. After step 706, history data manager 270 can move back to step 702 again to determine whether to allocate a new data chunk.

As an illustrative example, referring back to FIG. 6A, the entries 601, 602, 603, 604, 605, 606, 607, and 608 of FIG. 6A can become assigned chronologically, with entry 601 being assigned first and entry 608 being assigned last. End pointer 615 does not move during the assignment. With such an arrangement, start pointer 614 can then be associated with entry 609 and end pointer 615 remains associated with entry 613 following the assignment, as shown in FIG. 6B.

Referring back to FIG. 7, if a new chunk is not allocated, history data manager 270 may further determine whether to delete a data chunk in step 707. The determination can be based on, for example, a timestamp associated with the data chunk (e.g. the oldest data chunk is to be deleted to reserve space), or after receiving an immediate deletion instruction or a deletion message as shown in FIGS. 5G and 5H. After the data chunk is deleted, its associated chunk ID is to be returned back to buffer 600 so that the number can be reassigned to future new data chunk. After receiving the associated chunk ID in step 708, history data manager 270 can locate the chunk ID in the buffer and set the entry associated with the chunk ID as unassigned in step 709, and associate the entry with end pointer 615 in step 710. After step 710, history data manager 270 can move back to step 702 again to determine whether to allocate a new data chunk.

As an illustrative example, referring to FIG. 6C, after the aforementioned assignment, entry 601 becomes unassigned, as the data chunk associated with chunk ID 2 has recently been deleted, and end pointer 615 is now associated with entry 601. Since typically the chunks are allocated and deleted in the same chronological order (except in the scenarios where, as discussed above, immediate deletion instruction is received due to detection of unexpected behavior), a contagious block of unassigned entries can be largely maintained, and the boundary of such a contagious block can be indicated by start pointer 614 and end pointer 615. In some embodiments, such an arrangement facilitates exchange of information, between a compression device and a decompression device, about the chunk IDs each device has assigned and used, to increase the likelihood that that each device has the same set of chunk IDs being assigned to the same set of data chunks. For example, one of the devices may need to delete some data chunks due to resource constraints, but unable to transmit a deletion message to the other device because, for example, there is an interruption to the network connection which stops all the communication between the two devices. After the two devices resume communication, each device can easily find out the data chunks the other device have created or deleted by acquiring the start pointer and end pointer information, or the stored numbers which are designated as the start pointer and end pointer, and to assign only the numbers that are not assigned by both devices for new data chunks.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed:

1. An apparatus, comprising:
a memory device that stores first history data; and
at least one processor coupled to the memory device and configured to:
modify a first portion of the first history data;
transmit first information to a recipient device storing second history data, wherein the first information reflects the modification to the first portion of the first history data and allows the recipient device to modify a second portion of the second history data based on the first information, and wherein the second portion of the second history data is associated with the first portion of the first history data;
determine that the recipient device has modified the second portion of the second history data based on the first information;
receive input data; and
responsive to a confirmation that the recipient device has modified the second portion of the second history data based on the first information, transmit one or more reference tokens representing one or more portions of the input data, wherein the one or more portions of the input data have identical data stored in the first history data and the second history data, and the one or more reference tokens includes identifiers to assist the recipient device to find the identical data in the second history data, and allows the recipient device to reconstruct the one or more portions of the input data from the second history data.

2. The apparatus of claim 1, wherein the modification to the first history data includes adding first data to the first portion of the first history data and storing a first location value reflecting a location and a size of the added first data in the modified first history data.

3. The apparatus of claim 2, wherein the at least one processor is further configured to:
receive second information from the recipient device, wherein the second information includes a second location value associated with the addition of the first data to the second history data; and
determine a relationship between the first location value and the second location value;
wherein a determination that the recipient device has modified the second portion of the second history data based on the first information is based on the determined relationship between the first location value and the second location value.

4. The apparatus of claim 3, wherein the at least one processor is further configured to:
based on the relationship between the first location value and the second location value, detect a discrepancy between the modified first portion of the first history data and the modified second portion of the second history data; and
responsive to detecting the discrepancy, transmit a first instruction to the recipient device to cause the recipient device to delete the modified second portion of the second history data.

5. The apparatus of claim 3, further comprising a data storage device, and wherein the at least one processor is further configured to:
determine that the first portion of the first history data is closed to additional data after the first data is added to the first portion of the first history data;
responsive to receiving the second information, determine that the second portion of the second history data is also closed to additional data after the first data is added, wherein the second information includes an indication that the second portion of the second history data is closed; and
responsive to the determination that the second portion of the second history data is also closed to additional data after the first data is added, determine that the first portion of the first history data can be swapped out to the data storage device from the memory device.

6. The apparatus of claim 2, wherein the at least one processor is further configured to transmit the first information after at least part of the first data is added to the first portion of the first history data.

7. The apparatus of claim 1, wherein the modification to the first portion of the first history data includes deleting the first portion of the first history data from the memory device; and wherein the first information includes a first timestamp indicating when the first portion of the first history data is to be deleted, and a second instruction to the recipient device to delete the second portion of the second history data no later than the time indicated by the first timestamp.

8. The apparatus of claim 7, wherein the first portion of the first history data is associated with a first count value reflecting a number of times the first portion is accessed to generate the one or more reference tokens, and wherein the first information includes the first count value.

9. The apparatus of claim 8, wherein the second portion of the second history data is associated with a second count value reflecting a number of times the corresponding portion is accessed in response to receiving the one or more reference tokens; and wherein the second instruction allows the second portion of the second history data to be deleted before the time indicated by the first timestamp if the first count value matches with the second count value.

10. The apparatus of claim 7, wherein the first portion of the first history data is associated with a second timestamp reflecting a time when the first portion is updated, and wherein the at least one processor is further configured to determine to delete the first portion of the first history data based on the second timestamp.

11. The apparatus of claim 1, further comprising a buffer to store one or more identifiers, wherein the buffer is associated with a first pointer and a second pointer configured to indicate a portion of the identifiers that are not associated with any portion of the first history data.

12. A computer-implemented method for processing data, the method comprising:
receiving first history data from a memory device;
modifying a first portion of the first history data;
transmitting first information to a recipient device storing second history data, wherein the first information reflects the modification to the first portion of the first history data and allows the recipient device to modify a second portion of the second history data based on the first information, and wherein the second portion of the second history data is associated with the first portion of the first history data;
determining that the recipient device has modified the second portion of the second history data based on the first information;
receiving input data; and
responsive to a confirmation that the recipient device has modified the second portion of the second history data based on the first information, transmit one or more reference tokens representing one or more portions of the input data, wherein the one or more portions of the input data have identical data stored in the first history data and the second history data, and the one or more reference tokens includes identifiers to assist the recipient device to find the identical data in the second history data, and allows the recipient device to reconstruct the one or more portions of the input data from the second history data.

13. The method of claim 12, wherein the modification to the first history data includes adding first data to the first portion of the first history data and storing a first location value reflecting a location and a size of the added first data in the modified first history data.

14. The method of claim 13, further comprising:

receiving second information from the recipient device, wherein the second information includes a second location value associated with the addition of the first data to the second history data; and determining a relationship between the first location value and the second location value;

wherein the determination that the recipient device has modified the second portion of the second history data based on the first information is based on the determined relationship between the first location value and the second location value.

15. The method of claim 14, further comprising:

based on the relationship between the first location value and the second location value, detecting a discrepancy between the modified first portion of the first history data and the modified second portion of the second history data; and responsive to detecting the discrepancy, transmitting a first instruction to the recipient device to cause the recipient device to delete the modified second portion of the second history data.

16. The method of claim 14, further comprising:

determining that the first portion of the first history data is closed to additional data after the first data is added to the first portion of the first history data;

responsive to receiving the second information, determining that the second portion of the second history data is also closed to additional data after the first data is added, wherein the second information includes an indication that the second portion of the second history data is closed; and responsive to a determination that the second portion of the second history data is also closed to additional data after the first data is added, determining that the first portion of the first history data can be swapped out to a data storage device from the memory device.

17. The method of claim 12, wherein the modification to the first portion of the first history data includes deleting the first portion of the first history data from the memory device; and wherein the first information includes a first timestamp indicating when the first portion of the first history data is to be deleted, and a second instruction to the recipient device to delete the second portion of the second history data no later than the time indicated by the first timestamp.

18. The method of claim 17, wherein the first portion of the first history data is associated with a first count value reflecting a number of times the first portion is accessed to generate the one or more reference tokens, and wherein the first information includes the first count value.

19. The method of claim 18, wherein the second portion of the second history data is associated with a second count value reflecting a number of times the corresponding portion is accessed in response to receiving the one or more reference tokens; and wherein the second instruction allows the second portion of the second history data to be deleted before the time indicated by the first timestamp if the first count value matches with the second count value.

20. The method of claim 18, wherein the first portion of the first history data is associated with a second timestamp reflecting a time when the first portion is updated, and further comprising determining to delete the first portion of the first history data based on the second timestamp.

* * * * *